Patented July 4, 1939

2,164,851

UNITED STATES PATENT OFFICE 2,164,851

PROCESS OF SEPARATING MERCAPTANS CONTAINED IN A HYDROCARBON LIQUID

David Louis Yabroff, Berkeley, and Ellis R. White, Albany, Calif., assignors to Shell Development Company, San Francisco, Calif., a corporation of Delaware No Drawing. Application February 8, 1937, Serial No. 124,690

9 Claims. (Cl. 196—30)

This invention relates to the removal of weakly acid-reacting organic substances from solutions in organic liquids of the type of hydrocarbons, and in particular deals with the removal of mercaptans from petroleum distillates.

It is frequently necessary to eliminate small quantities of organic weakly acid components such as mercaptans and phenols, etc. from their solutions in substantially neutral hydrocarbon type liquids. The term, hydrocarbon type liquids, as herein used, refers to water-insoluble normally liquid organic substances which are neutral or slightly basic, such as the liquid hydrocarbons derived from petroleum, benzene, toluene, xylene, substituted normally liquid hydrocarbons which are substantially insoluble in water, for instance chlorinated hydrocarbons, of which chlorethane, ethylene dichloride, trichlorethylene, carbon tetrachloride, chlorpropane, chlorbutylene, chlorbenzene, brombenzene are examples; or nitro hydrocarbons, for example nitroethane, nitrobenzene; or other nitrogen containing hydrocarbons such as amyl or higher amines, aniline, pyridine, petroleum bases, etc.

It is the object of this invention to provide a method whereby acid-reacting organic substances of the type hereinbefore described can be removed efficiently and at low cost from solutions in hydrocarbon type liquids. As a particular application, it is the object to remove mercaptans from strongly sour gasoline distillates to reduce their sulfur content and to produce sweet or nearly sweet gasolines of improved octane numbers and lead susceptibilities, requiring but little after treatment for complete sweetening, if any.

In the U. S. Patent 2,059,075 by Yabroff and Givens it was shown that the efficacy of the removal of acidic organic substances from their solution in hydrocarbon type liquid by means of alkaline-reacting solutions which are substantially immiscible with said liquids, depends largely on the solvent power of the alkaline solution for the organic acids and on the alkalinity of the former. As a means for producing aqueous alkaline solutions of good solvent power for organic acids the use of quaternary ammonium bases was taught. The addition of alkali metal fatty acid salts of 3 to 5 carbon atoms to aqueous alkali hydroxide for the purpose of increasing the solvent power of the latter for mercaptans and the like was disclosed in our co-pending application Serial No. 118,920, filed January 2, 1937.

Now we have discovered that the alkali salts of phenyl acetic acid and certain substituted derivatives thereof have the ability of increasing the extraction power of aqueous alkali toward organic acids to a remarkable degree by virtue of the combination of two properties, namely high solubility in aqueous caustic alkali and high solubility enhancing effect. The expression "solubility enhancing effect" as herein used relates to the increase in the extraction power, i. e., the difference in extraction power of the aqueous caustic alkali for the organic acids before and after the addition of the said alkali salts herein called solubility promoters.

The terms alkali, alkali hydroxide, or caustic alkali refer to all strongly alkaline bases, i. e., the alkali metal and ammonium hydroxides, alkaline earth hydroxides, quaternary ammonium bases, alkali carbonates and bicarbonates, etc., although the hydroxides of the alkali metals are preferred. Especially useful are the sodium and potassium hydroxides, as being the strongest of the easily available bases. While sodium hydroxide is more generally used because of its lower cost, potassium hydroxide is usually more effective.

The salts which are used according to this invention are the alkali salts of phenyl acetic acid and of substituted phenyl acetic acids containing one neutral or basic substitution radical, such as a hydroxyl, amino, halide, nitro, nitrile, sulfone, etc., radical, which may be attached to the ring or to the alpha carbon of the side chain. Of the various possible substitution radicals we prefer those which are substantially resistant to hydrolysis by steam in the presence of strong caustic alkali, the term hydrolysis as herein used including saponification. Such radicals are the hydroxyl and amino radicals. Resistance to hydrolysis is an important factor in the regeneration of the spent caustic alkali solution containing solubility promoter.

Preferred alkali salts are the sodium and potassium salts, the potassium salt in many instances giving superior results because of a greater solubility in strong caustic solutions.

In the above referred to co-pending application, Serial No. 118,920, filed January 2, 1937, we have shown that the maximum extraction power for mercaptans and the like obtainable with an alkali metal carboxylate depends on a combination of three factors: Solubility of the carboxylate in the caustic alkali, concentration of the caustic alkali, and the effect of the acid radical.

The higher the concentration of the solubility promoter, the greater is the solubility enhancing effect, and consequently it is desirable to incorporate into the caustic alkali solution the maximum amount of the carboxylate which can be dissolved, i. e., it is desirable to use aqueous caustic alkali solutions substantially saturated with carboxylate.

The concentration of the caustic alkali may vary within wide limits. However, the higher the caustic alkali concentration the lower as a general rule are the solubilities of the carboxylates. While good results have been obtained with relatively dilute caustic alkali solutions having normalities below 2, we generally prefer stronger solutions having normalities preferably between 2 to 6. Depending upon the change of solubilities of various alkali salts in the aqueous caustic alkali with increasing caustic alkali concentration, it is with some salts advantageous to use caustic alkali concentrations near the lower limit of the preferred range and with other salts near the upper limit.

As to the effect of the acid radical we have found, that of the carboxylic acids possessing an aromatic ring, phenyl acetic acid only and its substitutes hereinbefore referred to, are sufficiently soluble in strong caustic alkali solution to produce solubility enhancing effects of practical values. For comparison the maximum K values obtainable with three homologous acids, namely benzoic acid, phenyl acetic and phenyl propionic acid, are given below. The ability of the caustic alkali solution to extract the weakly organic acids from hydrocarbon type liquids is represented by K, K being the coefficient of partition of these acids between the aqueous caustic alkali and hydrocarbon phases. In the examples below a solution of n-amyl mercaptan in iso-octane was extracted with a 5 N aqueous sodium hydroxide saturated with the alkali salts of the aromatic carboxylic acids.

| Salt | K |
| --- | --- |
| None | 1.0 |
| Sodium benzoate | 1.4 |
| Sodium phenyl acetate | 34 |
| Potassium phenyl acetate | 53 |
| Potassium phenyl hydroxy acetate | 9 |
| Potassium phenyl propionate | 1.4 |

The very poor results obtained with benzoates and phenyl propionates are due to the sparing solubilities of these salts in the aqueous caustic alkali.

Although the solubilities of the fatty acid salts increase with increasing temperatures, the application of elevated temperatures for extraction offers few advantages, if any, because the extraction power of caustic alkali containing solubility promoter for weak acids, such as mercaptans, decreases with increasing temperatures. Therefore we usually prefer to operate at temperatures between about 0 to 60° C.

The caustic alkali solution containing the requisite amount of solubility promoter may simply be mixed with the hydrocarbon distillate; the resulting mixture is then allowed to separate, the two liquids are separately withdrawn and the spent caustic alkali may be subjected to a treatment to recover at least the solubility promoter. For more efficient extraction, however, we prefer to flow the caustic alkali solution and hydrocarbon type liquids in countercurrent to each other through a series of continuous treaters.

In the following comparative examples the efficacy of a representative solubility promoter of the group herein described is demonstrated. Separate samples of a California straight run gasoline containing .1606% mercaptan sulfur were treated with 10% by volume of one of the following solutions:

(1) 5N aqueous sodium hydroxide;
(2) 5N aqueous sodium hydroxide saturated with (34%) sodium phenyl acetate;
(3) 5N aqueous sodium hydroxide saturated with (3.1%) sodium benzoate.

After extraction with the above solutions the samples contained .0346%, .0117% and .0333% mercaptan sulfur, respectively.

It is frequently not economical to carry the extraction of mercaptans to the point of sweetening. In such a case sweetening may be effected after extraction by any of the conventional methods as doctor treatment, treatment with hypochlorite, oxidation with air in the presence of suitable catalysts as copper compounds, lead sulfide, nickel sulfide, if desired in the presence of caustic alkali, etc. Since the amount of mercaptans left after extraction is very small, a light sweetening treatment is usually sufficient and the disulfides so formed are insufficient in quantity materially to reduce the knock ratings and lead susceptibilities of gasolines so treated.

Methods for the regeneration of the spent caustic alkali containing solubility promoter or the recovery of the solubility promoter depend largely upon the type of acids which were absorbed. If mercaptans only have been absorbed to form alkali mercaptides, the spent caustic alkali solution containing the mercaptides can be regenerated effectively by steaming, provided the polar substitution radical is not subject to hydrolysis or saponification under such conditions. Under some circumstances, oxidation methods may be used to convert the mercaptides to disulfides.

Since the salts of the acids herein described are substantially non-volatile, regeneration by steaming of the spent caustic containing same is comparatively easy, since no precautions need be taken to safeguard against losses by vaporization. Steaming can be carried out simply by blowing steam through the spent caustic alkali solution containing solubility promoter, which may be maintained as a pool, or by flowing it downward through a suitable tower in countercurrent to the ascending steam, or in any other suitable manner. The used steam, which after passage through the spent caustic alkali solution carries with it mercaptans, need not be carefully fractionated as in the case of volatile solubility promoters, since it contains no solubility promoter.

In order to render the caustic alkali regenerable and to permit its continued recirculation without substantial deterioration, we usually pretreat the hydrocarbon type liquid containing mercaptans and stronger acids in a suitable manner to remove the stronger acids, as by washing with water to remove acetic acid and the like, scrubbing it with a caustic solution or with a solution free from solubility promoter of tripotassium phosphate or the like to remove hydrogen sulfide, and/or fractionally distilling it, and thereafter subjecting the pretreated liquid to the treatment hereinbefore described.

We claim as our invention:
1. In the process of separating organic acid reacting substances contained in a water-insoluble neutral or basic organic liquid, the steps comprising treating said liquid with an aqueous solution of a strong base containing a substantial amount of a dissolved alkali metal salt of a phenyl-acetic acid under conditions to absorb at least a portion of said acid reacting substances in said aqueous solution and to form two liquid layers, one comprising the aqueous solution containing absorbed acid reacting substances and the other consisting essentially of the treated organic liquid, and separating the layers.

2. The process of claim 1 in which the aqueous solution is substantially saturated with the salt.

3. The process of claim 1 in which the phenyl-acetic acid is a substituted phenyl-acetic acid.

4. The process of claim 1 in which the phenyl-acetic acid is phenyl-hydroxy-acetic acid.

5. The process of claim 1 in which the phenyl-acetic acid is phenyl-amino-acetic acid.

6. In the process of separating organic acid reacting substances contained in a water-insoluble neutral or basic organic liquid, the steps comprising treating said liquid with an aqueous solution of alkali metal hydroxide containing a substantial amount of dissolved alkali metal salt of a phenyl-acetic acid under conditions to absorb at least a portion of said acid reacting substances in said aqueous solution and to form two liquid layers, one comprising the aqueous solution containing absorbed acid reacting substances and the other consisting essentially of the treated organic liquid, and separating the layers.

7. The process of claim 6 in which the concentration of the alkali metal hydroxide in the aqueous solution is from 2 to 6 normal.

8. In the process of separating mercaptans contained in a hydrocarbon liquid, the steps comprising treating said liquid with an aqueous solution of an alkali metal hydroxide containing a substantial amount of an alkali metal salt of a phenyl-acetic acid under conditions to absorb at least a portion of said mercaptans in said aqueous solution and to form two liquid layers, one comprising the aqueous solution containing absorbed mercaptans and the other consisting essentially of treated hydrocarbon liquid, and separating the layers.

9. In the process of separating mercaptans contained in the hydrocarbon liquid, the steps comprising treating said liquid with a 2 to 6 normal aqueous solution of potassium hydroxide containing a substantial amount of potassium phenyl-acetate under conditions to absorb at least a portion of said mercaptans in said aqueous solution and to form two liquid leyers, one comprising the aqueous soluton containing absorbed mercaptans and the other consisting essentially of treated hydrocarbon liquid, and separating the layers.

DAVID LOUIS YABROFF.
ELLIS R. WHITE.